March 1, 1960

M. D'ANDREA 2,926,548

DEVICE TO IMPART RADIAL DISPLACEMENTS
TO ECCENTRICALLY ROTATING PARTS

Filed April 10, 1953

INVENTOR.
MARINO D'ANDREA
BY

United States Patent Office 2,926,548
Patented Mar. 1, 1960

2,926,548

DEVICE TO IMPART RADIAL DISPLACEMENTS TO ECCENTRICALLY ROTATING PARTS

Marino D'Andrea, Rome, Italy

Application April 10, 1953, Serial No. 348,023

Claims priority, application Italy April 11, 1952

2 Claims. (Cl. 74—600)

The present invention has reference to a device adapted to impart radial displacements to parts rotating eccentrically about a shaft and also during rotation of the shaft at any speed.

A characteristic feature of the device made in accordance with the present invention is that of automatically obtaining such radial displacements by operatively connecting suitable control means with one of the rotating parts on which the rotation of the main machine drive shaft depends.

A device according to this invention has numerous mechanical applications and is rigidly efficacious, compact and particularly suitable for use in conjunction with machines for working metals and other materials and with machine tools.

According to the present invention a device is provided for imparting radial displacements to eccentrically rotating parts during the rotation of the parts, said device comprising a casing, a drive shaft arranged in the casing and revolving therein, the shaft being connected at one end with a power take-off and being provided at its other end with a revolving head, a slide which comprises the eccentrically-rotating element and is mounted on the head and provided with a threaded hole to receive a screw positioned diametrically of the shaft; a bevel gear fixed to the shank of the screw and rotated by a sun wheel keyed on the main shaft of the device through two sets of planet pinions and two double bevel gears revolving freely about the shaft; the first set of pinions, that is those which mesh with the sun wheel and the first loose bevel gear, revolving about shafts fixed to the casing of the device, and the second set of said planet pinions, that is, those which mesh with the two loose bevel gears, are mounted on shafts, the outer ends of which are fixed to a helical gear mounted freely on the shaft, while a worm revolving in a support fixed to the casing permits the rotation of the helical wheel.

Figure 1:
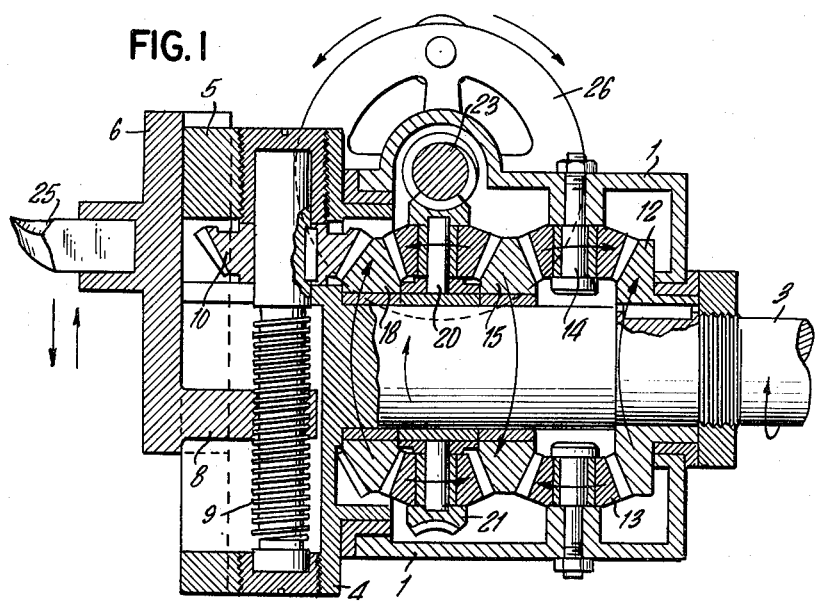
Figure 2:
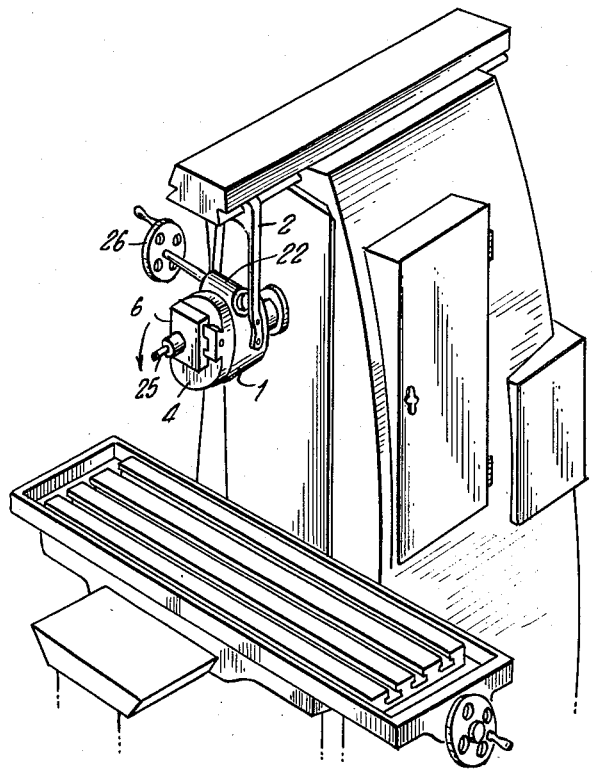

One constructional form of the invention is shown, by way of example, in the accompanying drawings, wherein:

Fig. 1 is a longitudinal section of a device made in accordance with the present invention; and Fig. 2 is a perspective view of a milling machine fitted with the device as shown in Fig. 1 applied to the headstock of the machine.

Referring to the attached drawing, the device in accordance with the present invention comprises a casing 1 fixed to the frame of a milling machine by means of a bracket 2 and enclosing an axial drive shaft 3 terminated at one end with an adapter for its connection to the milling machine and at the other end with a revolving head 4 comprising guides 5 on which a tool post slide or mount 6 is disposed mounted.

A threaded hole 8 is formed in the slide to receive a screw shaft 9 which is turnable through a bevel pinion 10 keyed to the screw shaft.

A bevel gear assembly in the form of bevel gear 12 is keyed on the drive shaft 3 and is adapted to impart motion to another bevel gear assembly including a double bevel gear 15 mounted freely on the shaft 3, motion from the bevel gear 12 to the bevel gear 15 being transmitted through a set of driving pinions 13 which are mounted on shafts 14 fixed to the casing 1.

The bevel gear 15 is adapted to drive another bevel gear assembly 18, in the form of a double bevel gear through a set of driving pinions 19 which are mounted on pin means or shafts 20 fixed to a rotatable helical gear or worm wheel 21 positioned on radii of the latter.

The bevel pinion 10, keyed to the screw shaft 9, meshes with the bevel gear 18 on the side opposite to that on which the bevel gear 18 engages with the pinion 19.

In a projecting boss 22 on the body 1 a recess is formed which is perpendicular to the longitudinal axis of the device to receive a worm 23 which, by engaging with the helical gear 21 rotates the latter, thus causing the speed of the bevel gear 18 to increase or to diminish relative to the speed of the gear 15 and consequently causing the bevel pinion 10 to rotate and the radial displacement of the milling cutter 25 which is mounted on the tool post slide 6. Thus worm 23 and associated members serve as a differential means.

The operation of the device is as follows:

When the device is mounted on the milling machine by the aid of the adapter, the drive shaft 3 causes the bevel gear 12 to rotate in the same direction as the arrow in Fig. 1. The bevel gear 15 will be turned in an opposite direction by the pinions 13 and for the same reason the double bevel gear 18 will turn in the same direction as the shaft 3, so that the pinion 10, by revolving like a planet wheel on the bevel gear 18 remains comparatively motionless, whereby the screw shaft 9 does not move from its position and the milling cutter or tool 25 revolves about the shaft 3 at a constant radius.

If, on the contrary, the helical gear 21 is rotated by turning a handwheel 26, a difference in speed will be obtained between the shaft 3 which is rigidly fixed to the cutter 25 and the bevel gear 18, which meshes with the bevel pinion 10 keyed to the screw 9 of the device, thus causing the cutter 25 to carry out radial displacements in either opposite direction, according to the direction of rotation of the handwheel.

The radial stresses due to the cutting tool 25 are taken up wholly by the drive shaft 3 and the screw shaft 9, while the gear means 12, 13, 15, 19, 18, and 10 are not subjected to stresses, so that substantially endless life of the device is ensured. It can thus be seen that it has been provided in accordance with the present invention a tool for turning, boring and facing for use in connection with tool machines, said tool comprising a casing, a rotatable drive shaft extending therethrough, first gear means including a screw shaft having an axis extending in transverse direction to said drive shaft and intersecting the axis of rotation of said drive shaft, a second gear means disposed about said drive shaft and in mesh with said first gear means for rotating same with said drive shaft, differential means operatively engaging said second gear means for rotating said first gear means about said axis of said screw shaft, slide means operatively engaging said screw shaft so that actuation of said differential means while rotating said drive shaft causes rotation of said screw shaft about the axis of said first gear means to thereby produce longitudinal displacement of said slide means lengthwise of said screw shaft simultaneously with rotation of said screw shaft and said slide means about the axis of said drive shaft, said drive shaft including a hollow head housing said screw shaft and said first gear means, said hollow head being provided with an aperture extending longitudinally of said screw shaft to permit displacement of said slide means lengthwise of said screw shaft and being further provided with an opening communicating with said casing, said first gear means being in mesh through said opening with said second gear means, and a tool mount on said slide means, whereby a tool when fastened in said tool mount is positioned eccentrically of the axis of rotation of said rotatable drive shaft.

If desired, the worm which permits the displacement of the helical wheel may be operated by turnable means which in turn is operated by the same power take-off which operates the shaft.

Various changes and modifications may be made without departing from the spirit and scope of the present invention and it is intended that such obvious changes and modifications be embraced by the annexed claims.

Having thus described the invention, and what is claimed as new and desired to be secured by Letters Patent, is:

1. An apparatus for imparting radial displacements to an eccentrically rotatable member comprising a rotatable drive shaft, a gear wheel having an axis extending perpendicular to the axis of said drive shaft and intersecting the axis of the latter, gear means disposed about said drive shaft and operated thereby for rotating said gear wheel, said gear means and said gear wheel being disposed substantially an equal radial distance from the axis of said drive shaft, said gear means including differential means, an externally threaded screw shaft fixed concentrically within said gear wheel and rotatable therewith and together with said drive shaft, a slide member rotatable with said drive shaft and provided with an internally threaded bore and engaging said threaded screw shaft, and an eccentrically located mount on said slide member for receiving a tool, actuation of said differential means during rotation of said drive shaft producing a difference in speed between said gear wheel and said drive shaft causing said gear wheel and screw shaft to rotate about the axis of said screw shaft and said gear wheel, thereby effecting radial displacement of said slide member with its mount simultaneously during rotation of the latter about the axis of said drive shaft.

2. An apparatus according to claim 1, including a casing, said drive shaft extending through and being journalled in said casing said drive shaft being provided with two ends, one of said ends of said drive shaft being adapted to be coupled with a power supply for rotation of said drive shaft, the other of said ends of said drive shaft being provided with a hollow head, said hollow head having an opening communicating with said casing and having an aperture extending in transverse direction to said drive shaft, said screw shaft being rotatably supported within said hollow head, said slide member being provided with an arm engaging said screw shaft through said aperture, said gear wheel being seated on said screw shaft within said head and extending into said casing through said opening, said gear means being located within said casing, a worm extending in transverse direction to said drive shaft from within said casing to a location exteriorly of said casing, means for rotating said worm and positioned exteriorly of said casing, and a worm wheel rotatably disposed about said drive shaft within said casing and operatively engaging said worm, said worm wheel including pin means, one of said gear means being mounted on said pin means for rotation about said drive shaft with said worm wheel, whereby when a tool is positioned on said slide member rotation of said drive shaft causes eccentric motion of said tool about said axis of said drive shaft, actuation of said worm during rotation of said drive shaft producing displacement of said slide member and said tool in radial direction of said drive shaft, said displacement being effected simultaneously with said drive shaft rotation by successive actuation of said worm, said worm wheel, said pin means and said one gear means.

References Cited in the file of this patent

UNITED STATES PATENTS

| 73,412 | Warren | Jan. 14, 1868 |
| 215,435 | Clark | May 20, 1879 |
| 626,996 | Hall | June 13, 1899 |
| 1,210,559 | Story | Jan. 2, 1917 |
| 1,469,121 | Stewart | Sept. 23, 1923 |
| 2,730,345 | Sloane | Jan. 10, 1956 |

FOREIGN PATENTS

| 97,292 | Switzerland | Jan. 2, 1923 |